United States Patent [19]

Ohwada

[11] 4,445,413

[45] May 1, 1984

[54] SLICING CUTTER BLADE

[75] Inventor: Kunio Ohwada, Tokyo, Japan

[73] Assignee: Kabushiki Kaisha Fujikoshi t/a Nachi-Rujikoshi Corp., Toyama, Japan

[21] Appl. No.: 338,130

[22] Filed: Jan. 8, 1982

[30] Foreign Application Priority Data

Mar. 23, 1981 [JP] Japan .................. 56-40477

[51] Int. Cl.³ .................. B23D 31/00; B26D 7/26; B28D 1/32
[52] U.S. Cl. .................. 83/676; 125/4
[58] Field of Search .................. 83/651, 663, 666, 676, 83/701, 835; 144/4, 208 E; 125/15

[56] References Cited

U.S. PATENT DOCUMENTS

| | | | |
|---|---|---|---|
| 2,721,488 | 10/1955 | Eaton | 125/15 |
| 3,396,714 | 8/1968 | Lauze | 125/15 |
| 4,135,499 | 1/1979 | Schumacher | 125/15 |
| 4,150,912 | 4/1979 | Gutsche | 125/15 |
| 4,151,826 | 5/1979 | Otto | 125/15 |

FOREIGN PATENT DOCUMENTS 54-31684 3/1979 Japan .

Primary Examiner—E. R. Kazenske
Assistant Examiner—Paul M. Heyrana
Attorney, Agent, or Firm—Spencer & Frank

[57] ABSTRACT

A slicing cutter blade, adapted for securing to a holder having a tension ring provided with a protuberance thereon, which comprises an annular sheet steel body rolled in a predetermined direction. The annular sheet steel body includes a cutting edge formed at the inner circumferential edge of a central opening in the annular body, an outer circumferential portion secured to the holder and a tension generating portion adjacent the outer circumferential portion which is forced into contact with the protuberance on the tension ring. A middle portion located between the cutting edge and the tension generating section is provided with a plurality of circumferentially arranged circular apertures. Two of these apertures having a first diameter are located on a first line parallel to the predetermined direction and two apertures of smaller diameter are located on a second line perpendicular to the first line. The remaining apertures are located between the first and second lines and have diameters which are greater than the diameter of the apertures on the second line, their diameters increasing as their distance from the second line increases.

3 Claims, 3 Drawing Figures

SLICING CUTTER BLADE

BACKGROUND OF THE INVENTION

The present invention relates to slicing machines for use in slicing materials such as silicon wafers for semiconductors, and more particularly to the improvement of a slicing cutter blade of the internal edge type for such slicing machines in which the cutter blade comprises an annular sheet steel body and a cutting edge formed at the inner circumferential edge of the annular sheet steel body, and which is adapted to be secured to holder means at the outer circumferential portion of the annular sheet steel body.

Heretofore, slicing cutter blades of the internal edge type used in slicing materials such as semiconductor silicon wafers have generally been tensioned by imparting uniform tension radially to the entire curcumference of the cutter blade. This process for tensioning the slicing cutter blade, however, has not provided the desired results. More particularly, the known slicing cutter blade comprises an annular sheet steel body usually made of a rolled sheet material of SUS 304 and fabricated by blanking the material with press working to form its inner and outer circumferential edges and fixing bolts holes. The rolled sheet material has elongation percentages which are different depending on the direction in which the rolling is done. Therefore, the cutting edge formed at the inner circumferential edge of the slicing cutter blade cannot retain in a truly circular shape upon tensioning. Thus, owing to the difference in the modulus of longitudinal elasticity due to the rolling direction of the material, the slicing cutter blade is tensioned with the inner circumferential edge and thus the cutting edge is deformed into an elliptical shape having a major dimension corresponding to an elongation percentage which is higher in a direction perpendicular to the rolling direction of the material. Because of this tendency, it has hitherto been essential, in a bolt tensioning process, for example, to effect adjustments in such a manner that the slicing cutter blade is tensioned strongly in the rolling direction of the material and weakly in a direction perpendicular to the rolling direction of the material. This adjustment has required much skilled labor and a prolonged time, thereby causing a bottleneck to the operation in the field. Meanwhile, in a hydraulic pressure tensioning process, the tensioning operation is quite simple and tensioning can be achieved in a relatively short period of time. However, this process has not permitted such adjustment as would obtain true circularity in a cutting edge on the inner circumferential edge of the slicing cutter blade. When the cutting edge at the inner circumferential edge of the slicing cutter blade is deformed into an elliptical shape upon tensioning, the service life of the slicing cutter blade is very short because the cutting edge becomes unbalanced when slicing is carried out.

On the other hand, a proposal has been made by the applicant of the present invention to provide, as disclosed in Japanese Patent Application Laid-Open No. 31684/79, particularly at FIG. 3 thereof, a slicing cutter blade of the internal edge type comprising an annular sheet steel body and a cutting edge formed at the inner circumferential edge of the annular sheet steel body, the slicing cutter blade being adapted to be secured at the outer circumferential portion of the annular sheet steel body to holder means such that the annular sheet steel body is forced to make contact at its tension generating section with a protuberance of a tension ring of the holder means, in which the annular sheet steel body is formed with a plurality of circumferentially arranged and equidistantly spaced circular apertures disposed substantially in a middle portion between the tension generating section and the cutting edge for generating increased circumferential stress in the cutting edge.

In the aforesaid construction, it becomes possible to generate for the same tensioning force an increased circumferential stress in the cutting edge at the inner circumferential edge when the slicing cutter blade is tensioned, the circumferential stress of the cutting edge having great importance with respect to the sharpness of the cutting edge. Thus a satisfactory circumferential stress in the cutting edge can be obtained with a relatively small tensioning force, and in fact such an advantage has been ascertained by experiments and numerical analysis.

However, the construction disclosed in Japanese Patent Application Laid-Open No. 31684/79 has still not eliminated the difference in elongation percentage due to the rolling direction of the material.

SUMMARY OF THE INVENTION

This invention has as its object the provision of a slicing cutter blade of the internal edge type in which the cutting edge at the inner circumferential edge of the slicing cutter blade can be formed substantially in a truly circular shape by correcting the difference in elongation percentage between the rolling direction of the material and the direction perpendicular to the rolling direction of the material when the slicing cutter is tensioned.

According to the invention, there is provided a slicing cutter blade comprising an annular sheet steel body made of a sheet steel material rolled in one direction and a cutting edge formed at the inner circumferential edge of said annular sheet steel body, said slicing cutter blade being adapted to be secured at the outer circumferential portion of said annular sheet steel body to holder means such that the annular sheet steel body is forced to make contact at its tension generating section with a protuberance of a tension ring of said holder means, said annular sheet steel body being formed with a plurality of circumferentially arranged and equidistantly spaced circular apertures disposed substantially in a middle portion between said tension generating portion and said cutting edge for generating increased circumferential stress in said cutting edge:

Wherein said circular apertures have their diameters progressively increased as they are disposed apart from a line perpendicular to said rolling direction of the annular sheet steel body and passing through the center of said slicing cutter blade.

By virtue of the aforesaid construction, the difference in elongation percentage between the rolling direction of the material and the direction perpendicular to the rolling direction can be compensated when the slicing cutter blade is tensioned, and therefore it is possible to maintain the cutting edge at the inner circumferential edge of the slicing cutter blade substantially in a truly circular shape.

Preferably, said circular apertures may comprise sixteen (16) apertures equidistantly arranged on a pitch circle of a diameter of 338.5 mm when said slicing cutter blade has an outer diameter of 546.1 mm and an inner diameter of 184.0 mm, said sixteen apertures including two apertures of a diameter of 13.45 mm arranged on said line perpendicular to said rolling direction and passing through the center of the slicing cutter blade, and four apertures in two pairs of a diameter of 18.45 mm, four apertures in two pairs of a diameter of 33.45 mm and six apertures in three pairs of a diameter of 43.45 mm which are arranged gradually apart from the first mentioned two apertures in said rolling direction, and when the outer diameter of said slicing cutter blade is changed, said apertures have their diameters changed substantially in proportion to the change in the outer diameter of the slicing cutter blade.

DESCRIPTION OF THE PREFERRED EMBODIMENT

Figure 1:
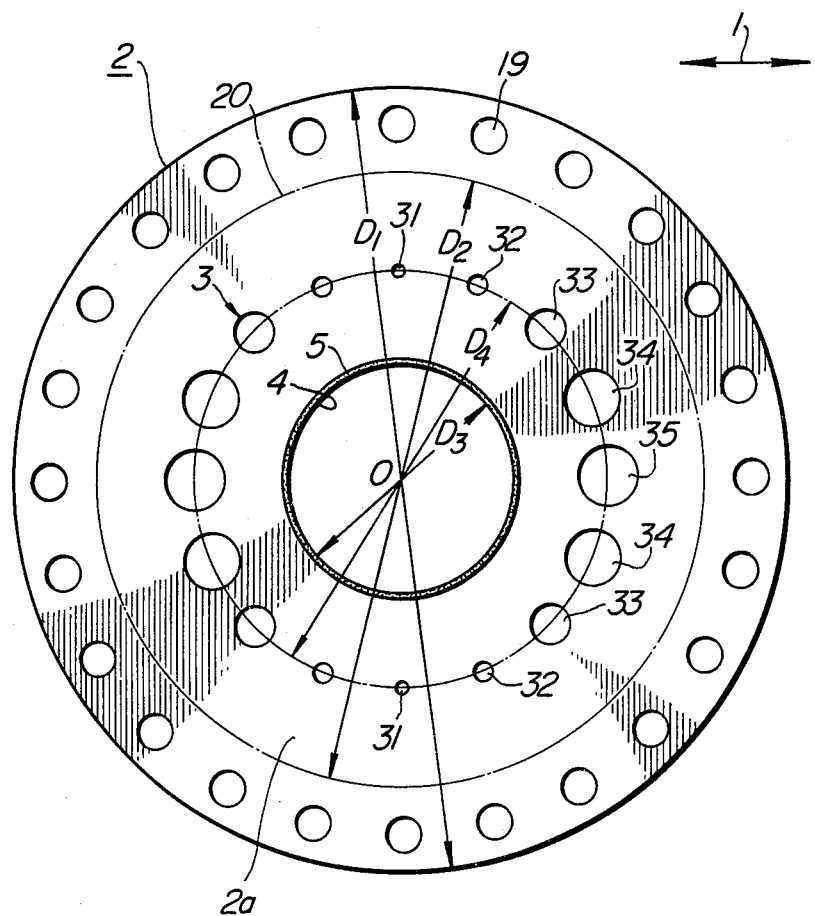
FIG. 1 is a plan view a slicing cutter blade of the internal edge type comprising one embodiment of the invention.

A preferred embodiment of the slicing cutter blade of the internal edge type in conformity with the invention will now be described by referring to the drawings.

Referring to FIG. 1, an internal edge type slicing cutter blade is generally designated by the reference numeral 2 and comprises an annular sheet steel body 2a and a cutting edge 5 formed at an inner circumferential edge 4 of the central opening of the annular sheet steel body 2a. The slicing cutter blade 2 is provided in an outer circumferential portion of the annular sheet steel body 2a with a multiplicity of openings 19 for insertion of fixing bolts (not shown) for securing the annular sheet steel body 2a and thus the slicing cutter blade 2 to holder means 21 or 22 shown in FIGS. 2 and 3, and/or tensioning bolts 11 shown in FIG. 2. The holder means 21 or 22 includes a tensioning ring 8 or 14 having a protuberance 23 or 24 with which the annular sheet steel body 2a is forced to contact at its tension generating section 20. Substantially in the middle between the tension generating section 20 and the cutting edge 5, the slicing cutter blade 2 is formed with a plurality of circumferentially arranged and equidistantly spaced apertures 3 for generating increased circumferential stress in the cutting edge 5.

The material for producing the annular sheet steel body 2a of the slicing cutter blade 2 is usually a sheet stainless steel (SUS 304) which has been rolled in the direction indicated in FIG. 1 by an arrow 1. When such a sheet stainless steel (SUS 304) material having a thickness of 0.12 mm and an outer diameter of 546.1 mm (or 21.5″ as generally referred to) is used, the results of actual measuring show that the material has moduli of longitudinal elasticity of about 16,500 kgf/mm$^2$ in the rolling direction 1 and about 19,300 kgf/mm$^2$ in a direction perpendicular to the rolling direction 1. It has been found that when the slicing cutter blade 2 having the sheet steel body 2a made of such a material is tensioned by imparting uniform tension radially to the entire circumference of the slicing cutter blade 2, the inner circumferential edge 4 is deformed into an elliptical shape of a dimension greater by about 0.3 mm in a direction perpendicular to the rolling direction 1 shown in FIG. 1. In view of the foregoing, the apertures 3 according to the invention have their diameters progressively increased as they are displaced apart from a line perpendicular to the rolling direction 1 of the material of the annular sheet steel body 2a and passing through the center 0 of the slicing cutter blade 2. More specifically, the apertures 3 comprise two apertures 31 of the smallest diameter located in diagonally spaced-apart relation to each other in a direction substantially perpendicular to the rolling direction 1, and apertures 32, 33, 34 and 35 having their diameters gradually increased as compared with the apertures 31 as they are spaced apart from the apertures 31 in the rolling direction 1.

By virtue of this construction, when the slicing cutter blade 2 is tensioned by applying uniform tension radially to the entire circumference of the slicing cutter blade 2, the inner circumferential edge 4 would show a tendency to be deformed into an elliptical shape having a dimension greater in the rolling direction 1 of the material, and therefore the aforesaid deformation of the material into the elliptical shape of a dimension greater in a direction perpendicular to the rolling direction 1 due to the difference in modulus of longitudinal elasticity can be substantially cancelled out. Thus, the inner circumferential edge 4 of the slicing cutter blade 2 can be maintained in a truly circular shape when uniform tension is radially imparted to the entire curcumference of the cutter blade 2.

The sizes and numbers of the apertures 3 or 31-35 may be properly selected depending on the dimensions of the slicing cutter blade 2. IT should be noted, however, that essentially the apertures 3 must be designed uniquely such that the circumferential stress generated in the edge portions of the apertures should not greatly exceed the circumferential stress generated in the cutting edge 5. Otherwise the slicing cutter blade would be ruptured starting at the apertures upon tensioning. It should also be noted that though the apertures 3 are circular in shape, the stresses generated in the apertures may vary depending on the sizes, numbers and positions of the apertures, and therefore it is preferable upon designing to determine the sizes, numbers and positions of the apertures by making calculations according to the finite element method.

One might think that when the slicing cutter blade 2 is tensioned, the circular apertures 3 may cause differences in radial elongations at the inner circumferential edge 4 corresponding in number to the apertures, and thus the cutting edge may be deviated from a truly circular shape. It has been ascertained, however, that the influences exerted by the formation of the apertures on the circularity of the cutting edge are very small because the differences in radial elongation are below about 0.002 mm.

An example of the slicing cutter blade 2 according to the invention will now be described in concrete form. In the embodiment shown in FIG. 1, when the outer diameter $D_1$ of the slicing cutter blade 2, the diameter $D_2$ of the tension generating section, the inner diameter $D_3$ and the thickness are 546.1 mm, 493.0 mm, 184.0 mm and 0.12 mm respectively, the apertures 3 comprises sixteen (16) apertures preferably formed on a pitch circle of a diameter $D_4$ of 338.5 mm, and the apertures 31, 32, 33, 34 and 35 preferably have diameters of 13.45 mm, 18.45 mm, 33.45 mm, 43.45 mm and 43.45 mm respectively, according to the finite element method. It has been ascertained that when the slicing cutter blade 2 having such apertures 3 is tensioned by applying uniform tension radially to the entire circumference, the inner circumferential edge 4 is maintained in a true circular shape in high precision. It has also been ascertained that the formation of the apertures causes an increase in the circumferential stress in the inner circumferential edge 4 having the cutting edge 5 which is the essential effect of the provision of the apertures, so that it is possible to reduce the tensioning force as compared with a slicing cutter blade without such apertures. The above embodiment has been described with reference to the slicing cutter blade having an outer diameter of 546.1 mm, however, when the slicing cutter blade has a different value for the outer diameter, the values of the aforesaid dimensions may be varied substantially in proportion to the change in the value of the outer diameter.

Figure 2:
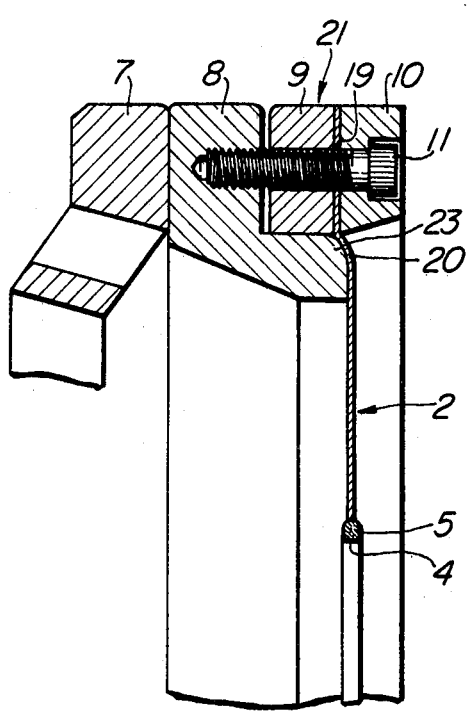
FIG. 2 and 3 are fragmentary sectional view of the slicing cutter blade shown in FIG. 1, showing the manner in which the slicing cutter blade is used.
Figure 3:
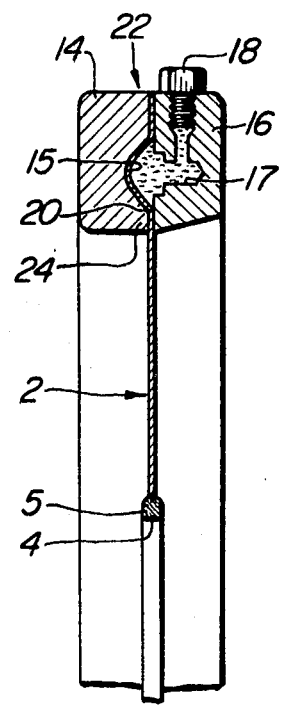

The manner in which the slicing cutter blade 2 according to the invention is used by mounting it to the holder means will be described by referring to FIGS. 2 and 3. In FIG. 2, the holder means 21 comprises a tension ring 8, a chuck guide ring 9 and a chuck upper plate 10. The tension ring 8 of the holder means 21 is secured to the forward end of a frame 7 of a cutter mounting spindle, and the slicing cutter blade 2 is held between the chuck guide ring 9 and chuck upper plate 10 by fixing bolts (not shown). The slicing cutter blade 2 is tensioned by uniformly fastening circumferentially arranged tensioning bolts 11, and then the inner circumferential edge 4 having the cutting edge 5 is maintained in a truly circular shape. In the embodiment shown in FIG. 3, the holder means 22 comprises a tension ring 14 and a chuck upper plate 15, and the tensioning means including tensioning bolts 11 described by referring to FIG. 2 is replaced by a groove 15 having a V-shape in cross section formed on the cutter blade mounting surface of the tension ring 14 of the holder means 22, a hydraulic pressure introducing duct 17 formed in the chuck upper plate 16, and a check valve 18 attached to the chuck upper plate 16. The slicing cutter blade 2 has its outer circumferential portion secured between the tension ring 14 and the chuck upper plate 16 by fixing bolts (not shown). A liquid of high viscosity is introduced through the check valve 18 into the duct 17 to increase the internal pressure, thereby tensioning the slicing cutter blade 2 along the V-shaped groove 15. Thus the inner circumferential edge 4 having the cutting edge 5 can be tensioned while maintaining a truly circular shape.

From the foregoing description, it will be appreciated that the present invention enables the inner circumferential edge of a slicing cutter blade having a cutting edge to be maintained in a truly circular shape when subjected to tensioning, either by a bolting tensioning process or a hydraulic pressure tensioning process. Thus the invention eliminates the need to carry out the tensioning operation over a prolonged period by using skilled labor, simplifies the tensioning operation, eliminates the defect of the cutting edge becoming unbalanced in use and increases the service life of the slicing cutter blade while providing an improved slice surface of higher quality, thereby ensuring high productivity and high quality of the product.

What is claimed is:

1. A slicing cutter blade, adapted for securing to a holder means having a tension ring provided with a protuberance thereon, comprising an annular sheet steel body having a central opening therein, said annular body being rolled in a predetermined direction and including:
    a cutting edge formed at the inner circumferential edge of the central opening in said annular body;
    an outer circumferential portion secured to said holder means;
    a tension generating section adjacent said outer circumferential portion, said tension generating section being forced into contact with the protuberance on the tension ring of said holder means; and
    a middle portion located between said cutting edge and said tension generating section, said middle portion having a plurality of circumferentially arranged and equidistantly spaced circular apertures disposed thereon for generating increased circumferential stress in said cutting edge, a first group of circular apertures being located on a first line parallel to said predetermined direction which passes through the center of the central opening in said annular body, said first group of circular apertures having a first diameter; a second group of circular apertures being located on a second line perpendicular to said first line which passes through the center of said central opening, said second group of circular apertures having a second diameter which is less than said first diameter; and a third group of circular apertures located intermediate said first and second lines having diameters greater than the diameter of the apertures on said second line, the diameters of said intermediately located apertures increasing as their distance from said second line increases.

2. A slicing cutter blade as claimed in claim 1 wherein the relative diameter of each of said circular apertures is proportional to the outer diameter of the outer circumferential portion of said annular sheet steel body.

3. A slicing cutter blade as claimed in claim 2 wherein the outer diameter of the outer circumferential portion of said annular sheet steel body is 546.1 mm, the diameter of the central opening in said annular body is 184.0 mm, and said circular apertures are sixteen (16) in number and equidistantly arranged on a pitch circle having a diameter of 338.5 mm, said sixteen apertures including two apertures of said second group each having a diameter of 13.45 mm, two apertures of said first group each having a diameter of 43.45 mm, four apertures of said third group immediately adjacent the apertures of said first group each having a diameter of 43.45 mm, four apertures of said third group immediately adjacent the apertures of said second group each having a diameter of 18.45 mm, and four apertures of said third group interposed between the apertures of said third group having diameters of 18.45 mm and 43.45 mm, said last-mentioned four apertures having diameters of 33.45 mm.

* * * * *